(12) United States Patent
Corral Rodriguez et al.

(10) Patent No.: US 9,764,783 B2
(45) Date of Patent: Sep. 19, 2017

(54) SPARE WHEEL PICKUP ASSEMBLY

(71) Applicant: BATZ, S.COOP., Igorre (ES)

(72) Inventors: Pedro Corral Rodriguez, Castro Urdiales (ES); José Miguel Macho San Sebastian, Galdakao (ES)

(73) Assignee: BATZ, S.COOP., Igorre (ES)

( * ) Notice: Subject to any disclaimer, the term of this patent is extended or adjusted under 35 U.S.C. 154(b) by 87 days.

(21) Appl. No.: 14/484,113

(22) Filed: Sep. 11, 2014

(65) Prior Publication Data
US 2015/0069311 A1 Mar. 12, 2015

(30) Foreign Application Priority Data
Sep. 11, 2013 (ES) .................................. 201331326

(51) Int. Cl.
*B62D 43/04* (2006.01)
*B66D 1/34* (2006.01)

(52) U.S. Cl.
CPC ............ *B62D 43/045* (2013.01); *B66D 1/34* (2013.01)

(58) Field of Classification Search
CPC ................................ B66D 1/34; B62D 43/045
USPC ........................................................ 254/323
See application file for complete search history.

(56) References Cited

U.S. PATENT DOCUMENTS

| 149,047 A * | 3/1874 | Lovell | B65H 75/38 |
| | | | 242/390.4 |
| 1,555,544 A * | 9/1925 | Anthony | B66D 1/34 |
| | | | 242/587.1 |
| 1,913,508 A * | 6/1933 | Phillips | B66D 1/34 |
| | | | 242/587.1 |
| 2,019,512 A * | 11/1935 | Stahl | B66D 1/36 |
| | | | 242/396.4 |
| 2,053,976 A * | 9/1936 | Stahl | B62D 43/045 |
| | | | 242/602.2 |
| 2,329,943 A | 9/1943 | Robins | |
| 2,811,322 A * | 10/1957 | Wilkinson | B66D 1/34 |
| | | | 242/125.1 |

(Continued)

FOREIGN PATENT DOCUMENTS

EP 0507032 A2 10/1992
EP 0635420 B1 1/1995

(Continued)

OTHER PUBLICATIONS

Extended European Search Report performed by the European Patent Office for EP Application No. 14382339.1, mailed Jan. 28, 2015, 8 pages, The Hague.

(Continued)

*Primary Examiner* — Emmanuel M Marcelo
*Assistant Examiner* — Michael Gallion
(74) *Attorney, Agent, or Firm* — Edell, Shapiro & Finnan LLC

(57) ABSTRACT

A unit for picking up a spare wheel. According to one implementation the unit includes a drum which rotates for winding or unwinding a cable, the drum having a body with a side surface wherein which is formed a helical groove that receives the cable, one end of the cable being attached to a terminal, the terminal being pivotal with respect to the body of the drum. The pivotal movement of the terminal being blocked by at least one turn of the cable when the cable is at least partially wound on the drum.

14 Claims, 6 Drawing Sheets

(56) References Cited

U.S. PATENT DOCUMENTS

| | | | | |
|---|---|---|---|---|
| 2,846,162 A * | 8/1958 | Allin, Sr. | ............... | B66D 1/34 242/125.1 |
| 3,836,123 A * | 9/1974 | Bausenbach | ............ | B66D 1/28 242/157.1 |
| 4,059,197 A | 11/1977 | Iida | | |
| 4,544,136 A | 10/1985 | Denman | | |
| 4,600,352 A * | 7/1986 | Ivan | ................... | B62D 43/045 242/407 |
| 4,625,947 A | 12/1986 | Denman | | |
| 4,693,453 A | 9/1987 | Ivan | | |
| 4,997,164 A | 3/1991 | Kito | | |
| 5,100,106 A * | 3/1992 | Denman | ............ | B62D 43/045 254/323 |
| 5,125,628 A * | 6/1992 | Rempinski | .......... | B62D 43/045 254/323 |
| 5,251,877 A | 10/1993 | Rempinski | | |
| 5,415,377 A | 5/1995 | Britt | | |
| 6,409,454 B1 | 6/2002 | Yamamoto | | |
| 6,554,253 B1 | 4/2003 | Dobmeier | | |
| 6,923,394 B2 | 8/2005 | Goldstein | | |
| 6,981,670 B2 * | 1/2006 | Harrington | ............ | B65H 75/26 242/125.1 |
| 7,226,039 B2 * | 6/2007 | Sauner | ................. | B62D 43/045 254/323 |
| 7,404,545 B2 | 7/2008 | Steiner, Jr. | | |
| 7,487,953 B2 * | 2/2009 | Sauner | ................. | B62D 43/045 224/42.12 |
| 7,837,179 B2 | 11/2010 | Steiner, Jr. | | |
| 8,210,404 B2 * | 7/2012 | Reidl | ................... | B62D 43/007 224/42.23 |
| 8,469,149 B2 * | 6/2013 | Meillet | ................... | B66D 1/34 182/230 |
| 8,925,687 B2 * | 1/2015 | Meillet | ............. | A62B 35/0093 182/230 |
| 8,956,101 B2 * | 2/2015 | Gonzalez Sagarzazu | ................ | B62D 43/045 224/42.23 |
| 9,315,224 B2 * | 4/2016 | Corral Rodriguez | | B62D 43/045 |
| 2004/0206849 A1 | 10/2004 | Harrington | | |
| 2005/0082517 A1 * | 4/2005 | Steiner | ................ | B62D 43/045 254/323 |
| 2009/0032786 A1 | 2/2009 | Steiner, Jr. | | |
| 2012/0121366 A1 | 5/2012 | Ogawa | | |

FOREIGN PATENT DOCUMENTS

| | | |
|---|---|---|
| EP | 0697326 A2 | 2/1996 |
| EP | 0784006 B1 | 7/1997 |
| EP | 1352871 A2 | 10/2003 |
| ES | 1073381 U | 12/2010 |
| GB | 542849 A | 1/1942 |
| GB | 2253198 A | 9/1992 |

OTHER PUBLICATIONS

Extended European Search Report performed by the European Patent Office for EP Application No. 14382341.7, mailed Jan. 28, 2015, 6 pages, The Hague.
Spanish Written Opinion performed by the Spanish Patent Office for ES Application No. 201331321, mailed Feb. 27, 2015, 6 pages, Madrid Spain.
Partial English translation of the Spanish Written Opinion performed by the Spanish Patent Office for ES Application No. 201331321, mailed Feb. 27, 2015, 6 pages, Madrid Spain.
Spanish Written Opinion performed by the Spanish Patent Office for ES Application No. 201331326, mailed Mar. 9, 2015, 6 pages, Madrid Spain.
Partial English translation of the Spanish Written Opinion performed by the Spanish Patent Office for ES Application No. 201331326, mailed Mar. 9, 2015, 6 pages, Madrid Spain.

\* cited by examiner

SPARE WHEEL PICKUP ASSEMBLY

CROSS-REFERENCE TO RELATED APPLICATIONS

This application relates to and claims the benefit and priority to Spanish Patent Application No. P201331326, filed Sep. 11, 2013.

TECHNICAL FIELD

The present invention relates to units for picking up spare wheels in vehicles.

BACKGROUND

Units for picking up spare wheels designed for use in vehicles, and more specifically units designed for picking up or releasing a spare wheel that are arranged below the chassis (or on the underbody) of the vehicle are known in the state of the art.

These units generally comprise a mechanism with a transmission shaft which allows winding or unwinding a cable when the user manipulates the transmission shaft with a tool. The transmission shaft comprises a gear assembly which allows transmitting a torque which the user produces with the tool and a drum which allows winding or unwinding the cable when the torque is transmitted from the gear assembly.

Drums winding the cable onto the body of the drum by overlapping the different turns of the cable, defining a drum with a larger diameter, and drums winding the different turns of the cable over the entire surface of the body of the drum in a helical groove, defining a drum with a smaller diameter but greater depth, are known. The drums of both types comprise a terminal to which one end of the cable is attached, the terminal being attached to the drum.

European Publication No. EP0697326 A2 describes a unit for picking up spare wheels comprising a drum which rotates for winding or unwinding a cable, one end of the cable being attached to a pivoting terminal, and the terminal being attached to the body of the drum.

SUMMARY OF THE DISCLOSURE

According to some implementations a unit for picking up spare wheels is provided that comprises a drum which rotates for winding or unwinding a cable, one end of the cable being attached to a pivoting terminal, and the terminal being coupled to the body of the drum. According to some implementations the drum includes a substantially cylindrical body with a side surface having a helical groove for winding the cable by means of a plurality of turns, at least one turn of the cable located in the helical groove blocking the pivoting of the terminal.

Units for picking up spare wheels in the form of a drum with a helical groove have a problem when the cable is unwound from the drum. The cable is attached to the drum by means of a terminal, and when the cable is wound onto the drum subjected to a load, i.e., the spare wheel, the cable is supported on the helical groove, being tightened against the surface of the body of the drum. However, when the cable is unwound with no load, subjected to a high torque in a repair shop or during initial installation in an automotive manufacturing plant, the drum pushes the terminal and the terminal in turn pushes the cable, the cable being separated from the helical groove. Therefore, units for picking up spare wheels comprise an opening that provides an outlet for the cable from the drum, the hole being shifted a certain angle from the circular line demarcating the outer diameter of the body of the drum, and the pivoting of the terminal allowing the correct orientation of the cable towards the outlet opening. Particularly, in units comprising drums with a helical groove, the cable tends to form a loop in the outlet opening that may damage the cable or even break it.

According to the units for picking up spare wheels as disclosed herein, the terminal allowing the attachment of the cable to the drum is a pivoting terminal, such that when the cable is unwound the terminal pushes the cable, and due to the separation of the cable from the helical groove the terminal tends to pivot, being moved outside the circular line demarcating the outer diameter of the body of the drum. The cable exiting the terminal runs along the helical groove of the surface of the body of the drum and blocks the terminal. Therefore, while the cable is being unwound, the terminal, which is blocked, cannot pivot, and the terminal is released only when there is less than one turn of cable left, the terminal then being able to pivot, the formation of a loop and therefore problems with the cable being prevented.

These and other advantages and features will become evident in view of the drawings and the detailed description of the invention.

DETAILED DESCRIPTION

Figure 1:
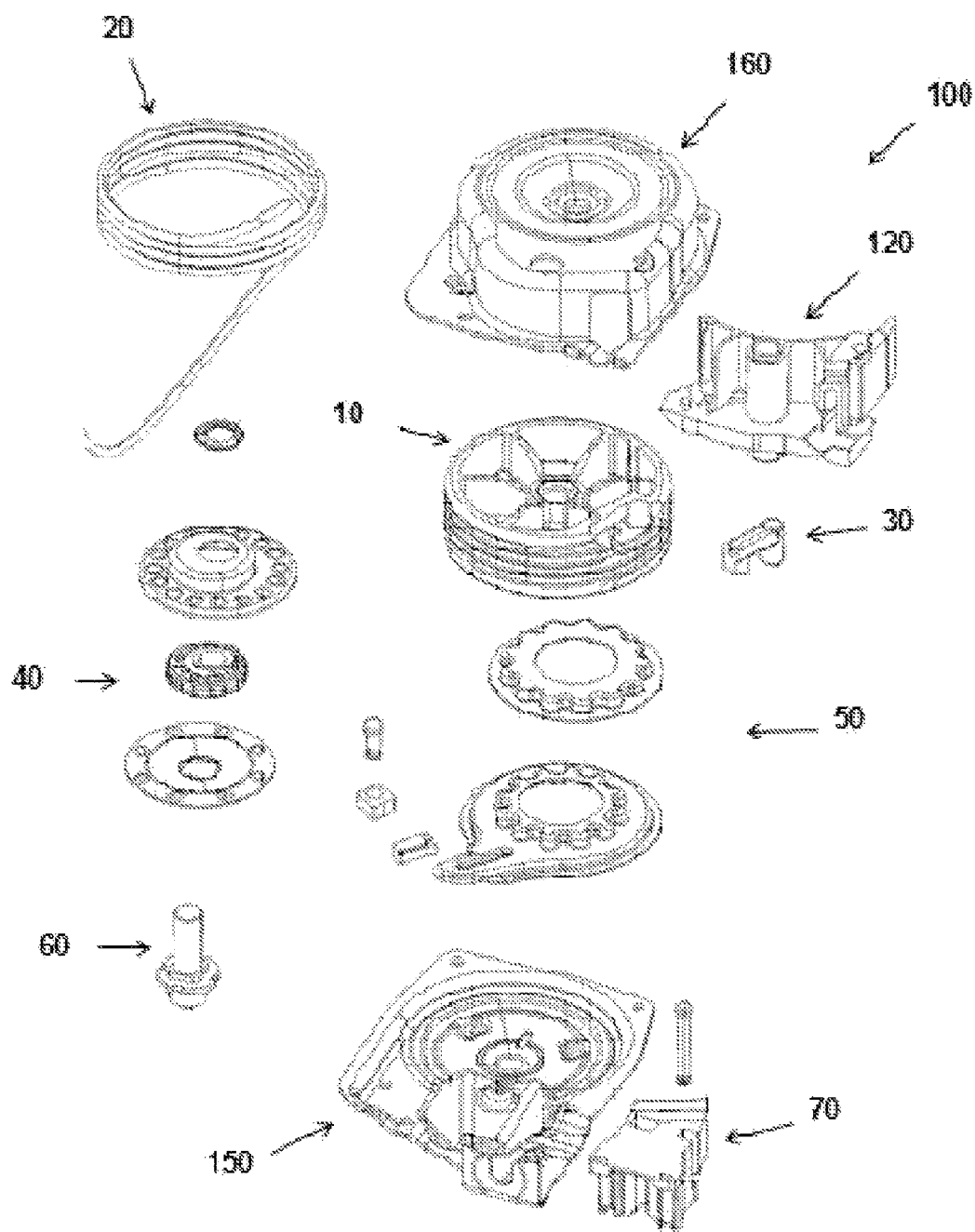
FIG. 1 shows an exploded perspective view of a unit for picking up spare wheels according to one embodiment.

FIG. 1 shows an exploded perspective view of a first embodiment of a unit for picking up spare wheels 100, the unit 100 comprising two casings, a cover casing 150 and a housing casing 160, a drum 10 which rotates for winding or unwinding a cable 20, and a gear assembly 50. The gear assembly 50, which allows transmitting the torque which a user produces with a tool (not shown in FIG. 1) by acting on a drive shaft 60 of the unit 100, comprises in this embodiment a cam and a ring gear. The drive shaft 60 is assembled in an eccentric assembly 40 and the eccentric assembly 40 is coupled to the gear assembly 50, the eccentric assembly 40 being assembled in a hole of the cam. The gear assembly 50 is coupled through the ring gear to the drum 10, thus allowing transmitting the torque applied by the user to the drive shaft 60 by means of the tool, and the rotation of the drum 10 in one direction or another thus being obtained.

Figure 2:
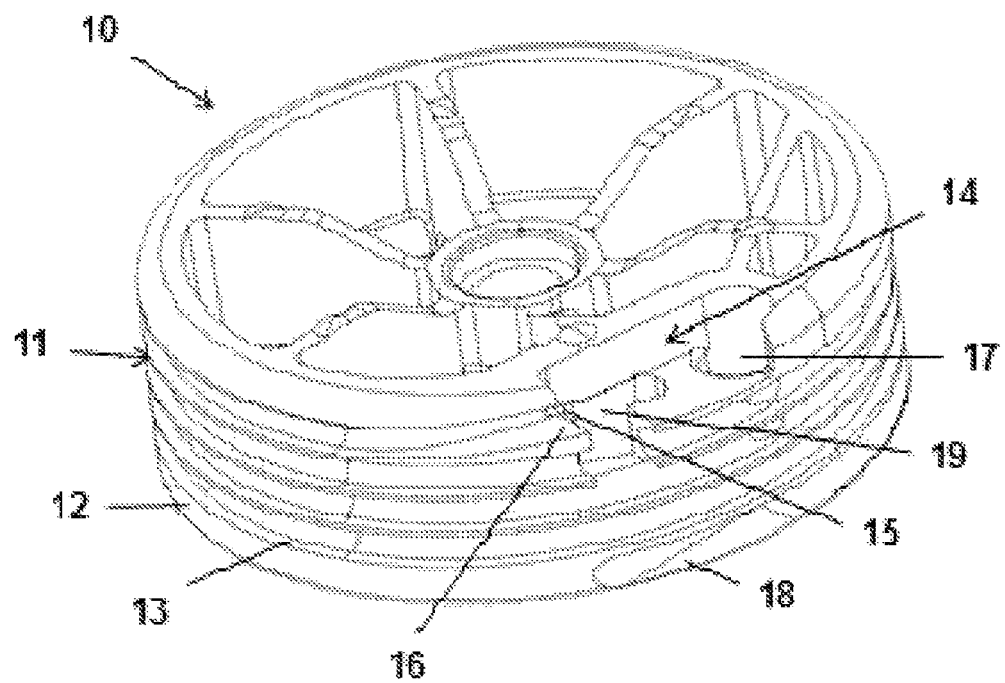
FIG. 2 shows a perspective view of the drum of the unit of FIG. 1.
Figure 3:
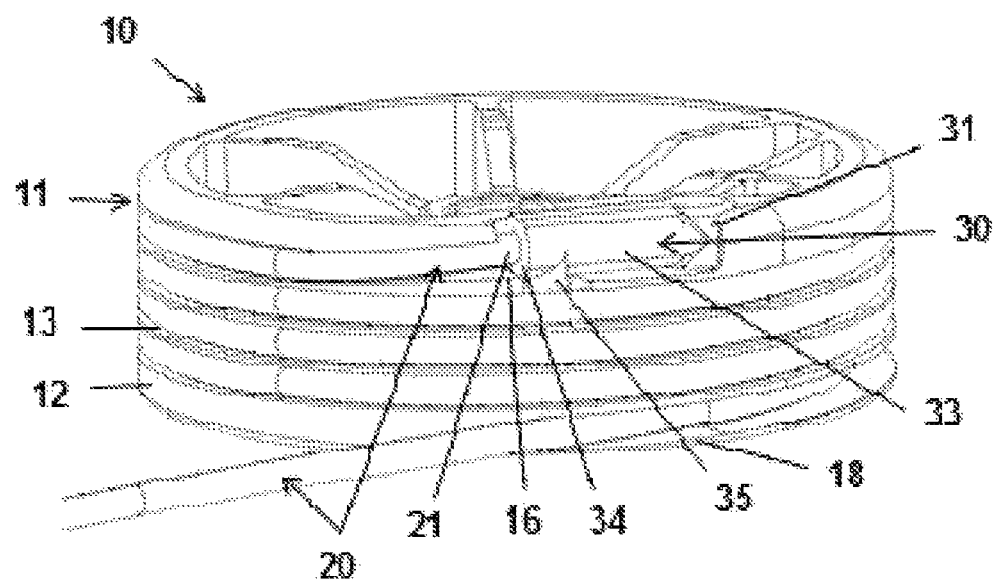
FIG. 3 shows a perspective view of the drum of FIG. 2 with the cable and the terminal assembled.

FIG. 2 shows a perspective view of the drum 10 of the unit 100 of FIG. 1, and FIG. 3 shows a perspective view of the drum of FIG. 2 with the cable 20 already assembled. The drum 10 comprises a substantially cylindrical body 11 with a side surface 12 onto which the cable 20 is wound. There is defined on the side surface 12 a helical groove 13 which, in this embodiment of the unit 100, covers the entire side surface 12 of the body 11 of the drum 10. The helical groove 13 starts at one end 16 which is arranged at one end of the side surface 12 adjacent to a face of the cylindrical body 11 of the drum 10. The helical groove 13 ends at another end 18 arranged at one end of the side surface 12 opposite the end where the end 16 of the helical groove 13 is located. One end 21 of the cable 20 is attached to a terminal 30, such attachment carried out by pressure or by another way of attachment, and the terminal 30 is in turn attached to the body 11 of the drum 10.

Figure 6:
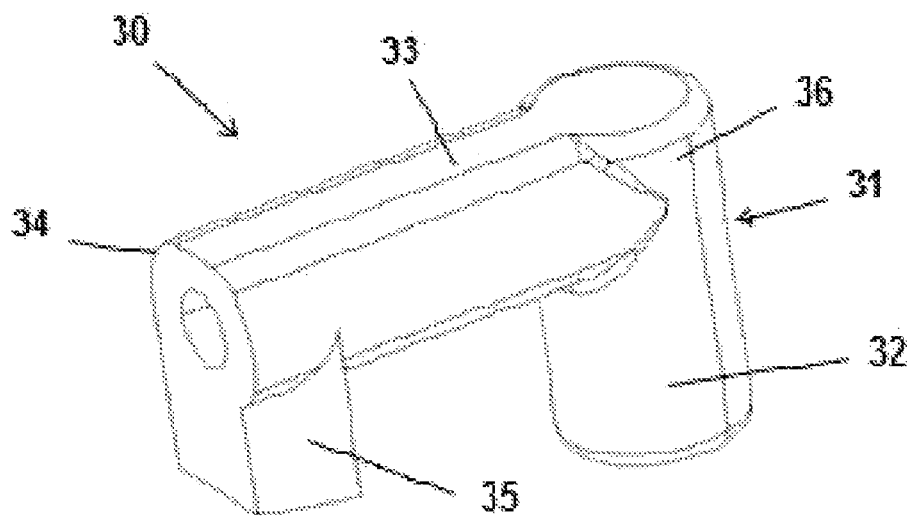
FIG. 6 shows a perspective view of the terminal of the unit of FIG. 1.

The body 11 of the drum 10 includes a housing 14 in which the terminal 30 fits. The terminal 30 may have, as shown in FIG. 6, a substantially cylindrical body 31 the axis of which is substantially parallel to the axis of the body 11 of the drum 10 when the terminal 30 is assembled in the housing 14 of the body 11 of the drum 10. The body 31 has one end 32 which is housed in a substantially cylindrical cavity 17 of the housing 14, such that the terminal 30 can pivot about its body 31 in the cavity 17 of the housing 14. A projection 33, which may also be a substantially cylindrical body, projects from the body 31 of the terminal 30 in a direction substantially perpendicular to the axis of the body 31, projecting from one end 36 of the body 31 opposite the end 32. This projection 33 comprises one end 34 opposite the attachment of the projection 33 with the body 31 of the terminal 30, this end 34 having a hole running along the axis of the body of the projection 33 which allows inserting the end 21 of the cable 20. Therefore, and after a mechanical operation, the cable 20 is attached to the terminal 30. The terminal 30 comprises a stop 35 projecting from the projection 33 at its end 34 in a direction substantially perpendicular to the axis of the projection 33, and in turn in a direction substantially parallel to the axis of the body 31 of the terminal 30. This stop 35 has the same orientation as the body 31 of the terminal 30, although it is shorter than the body 31 in this embodiment of the unit 100.

The housing 14 of the body 11 of the drum 10 comprises in this embodiment a cavity 19, the stop 35 of the terminal 30 fitting in the cavity. This cavity 19 has a face that opens towards the side surface 12 of the body 11, allowing the passage of the stop 35 outside the circular line demarcating the outer diameter of the body 11. The housing 14 also includes an opening 15 located close to the cavity 19 and above the cavity 19, coinciding with or located adjacent to or near the end 16 of the helical groove 13, such that the end 34 of the projection 33 of the terminal 30 coincides with or is located adjacent or near the opening 15 of the housing 14, and the end 21 of the cable 20 can thus come out towards the end 16 of the helical groove 13. When the terminal 30 is assembled in the housing 14, with the cable 20 attached to the terminal 30 and wound onto the body 11 of the drum 10, the end 21 of the cable 20 exits through the opening 15 of the housing 14 and extends around the entire helical groove 13 starting from the end 16. In this embodiment, the first turn of the cable 20 passes over the stop 35 of the terminal 30. Therefore, any pivoting tendency of the terminal 30 is blocked, since the turn of the cable 20 passing over the stop 35 of the terminal 30 prevents it.

It is appreciated that the terminal 30 may take many forms and is not limited to the construction previously described in conjunction with FIG. 6. The terminal only need pivot with respect to the drum 11 and have a part onto which at least one turn of the cable passes to prevent the terminal 30 from pivoting.

Figure 4:
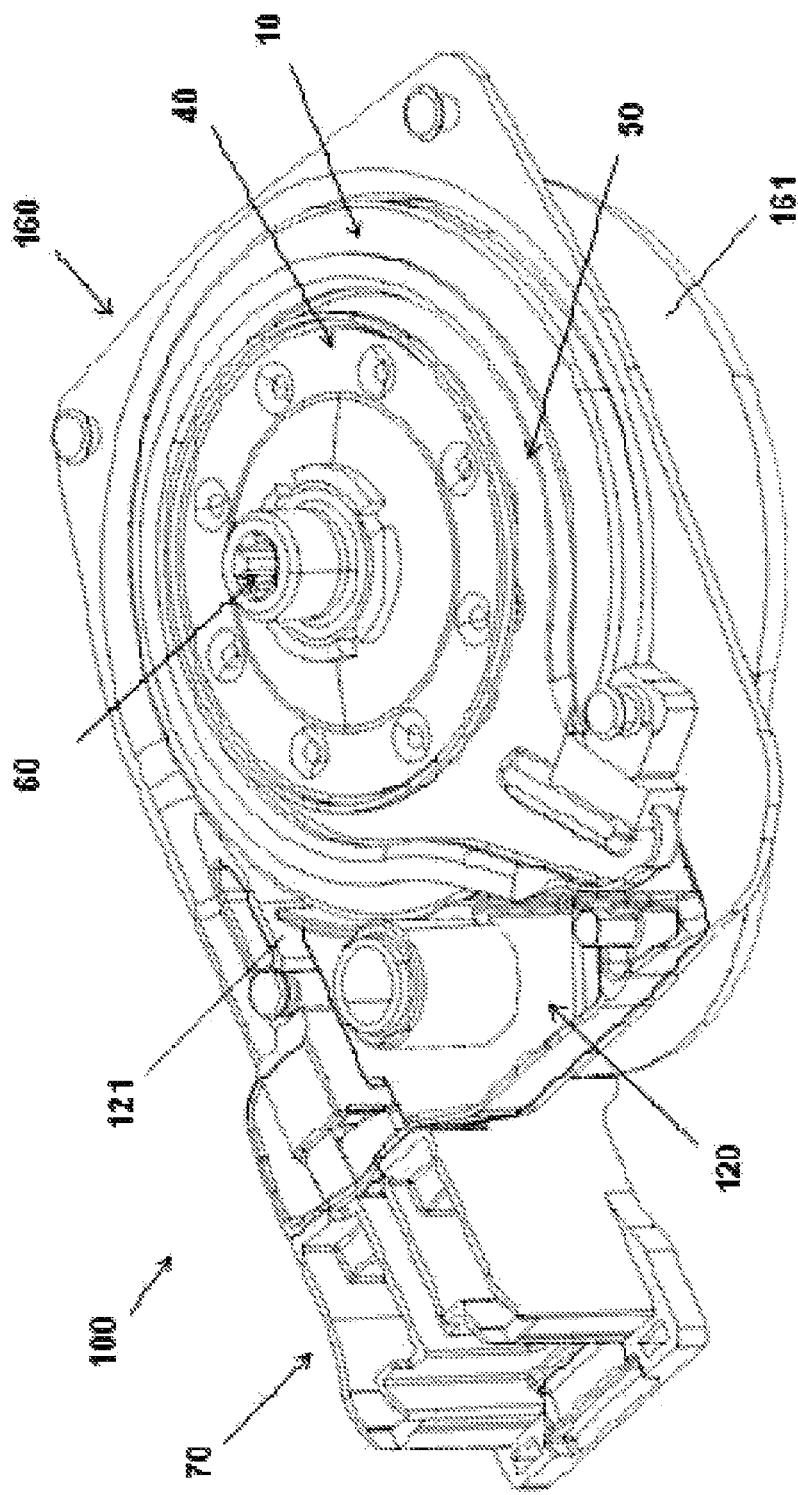
FIG. 4 shows a perspective view of the unit of FIG. 1 in which the cover casing has been removed.
Figure 5:
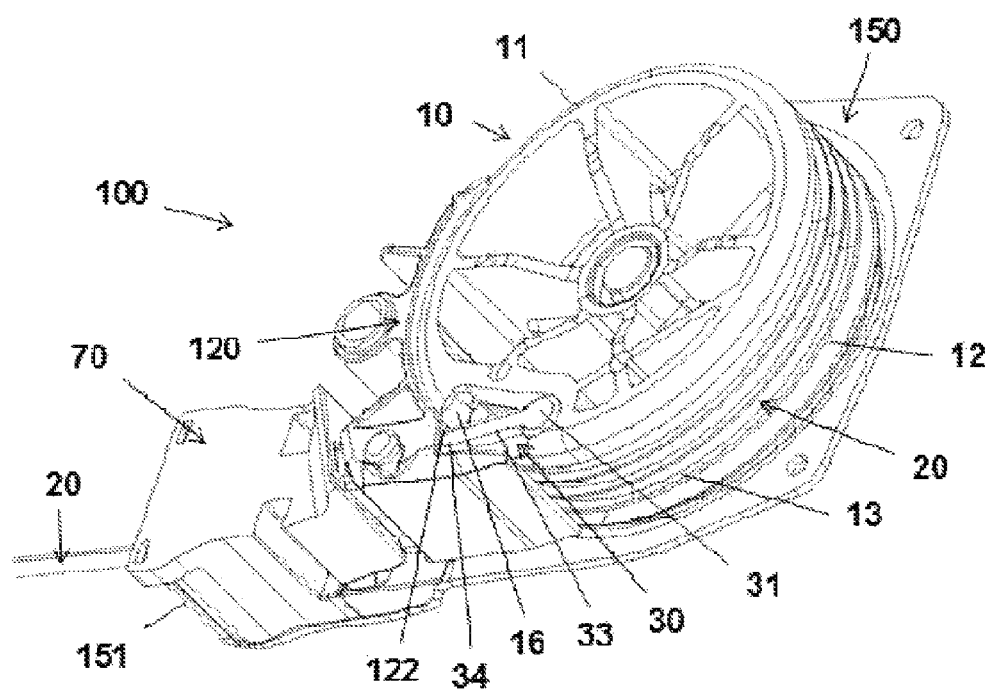
FIG. 5 shows a perspective view of the unit of FIG. 1 in which the housing casing has been removed, with the cable and the terminal assembled.

In the embodiment of FIG. 1, the unit 100 has two casings, a cover casing 150 and a housing casing 160, internally enclosing the transmission shaft for transmitting torque, and is formed by the gear assembly 50, the eccentric assembly 40, the drum 10 and the drive shaft 60. FIG. 4 shows a perspective view of the unit 100 in which the cover casing 150 has been removed, and FIG. 5 shows a perspective view of the unit 100 in which the housing casing 160 has been removed and in which the cable 20 and the terminal 30 are assembled.

Figure 7:
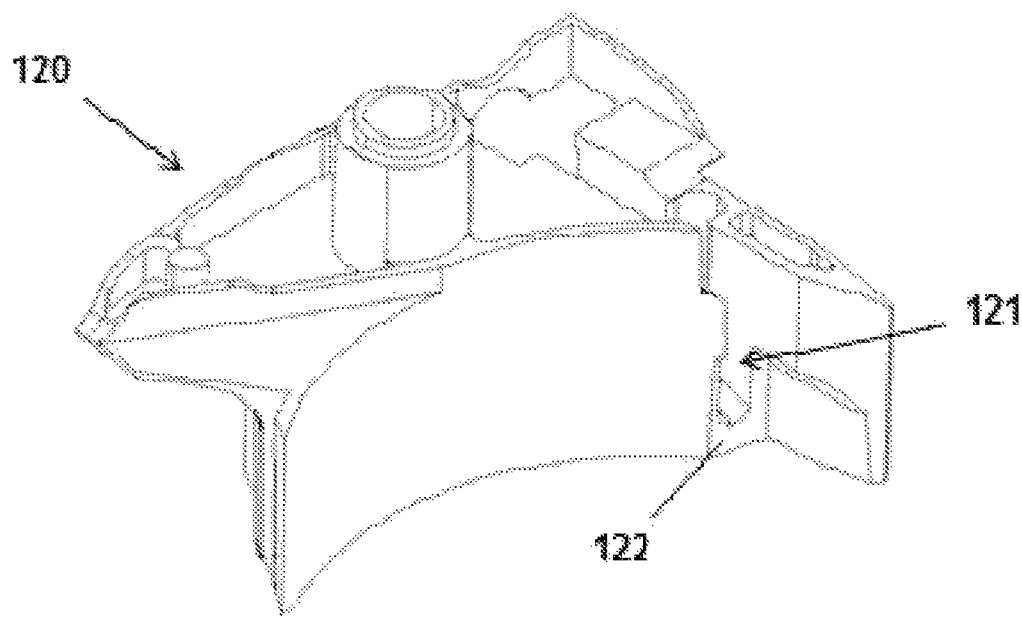
FIG. 7 shows a perspective view of the sliding guide of the unit of FIG. 1.
Figure 8:
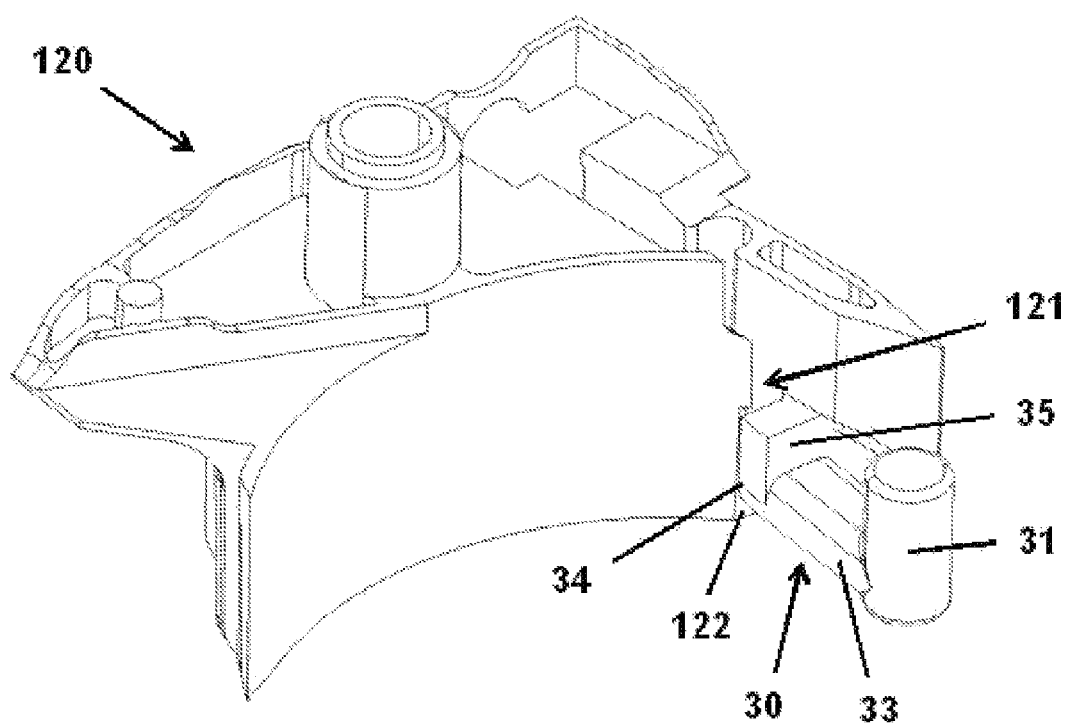
FIG. 8 shows a perspective view of the sliding guide of FIG. 7 with the abutting terminal.

The drum 10 is housed in the housing casing 160, the housing casing 160 having a substantially cylindrical wall 161 which surrounds the side surface 12 of the body 11 of the drum 10. Therefore, and to enable winding or unwinding the cable 20 with respect to the drum 10, there is a space between the wall 161 of the housing casing 160 and the helical groove 13 allowing the tight fitting passage of the cable 20. The unit 100 also comprises a sliding guide 120 which is preferably made of plastic but can be made of another material, the sliding guide 120 being assembled in the housing casing 160 and arranged adjacent to the body 11 of the drum 10. The sliding guide 120 comprises, as shown in FIGS. 7 and 8, an opening 121 traversing the sliding guide 120 and allowing the passage of the cable 20. When the sliding guide 120 and the drum 10 are assembled in the housing casing 160, the opening 121 is arranged facing the helical groove 13 of the body 11 of the drum 10, being shifted a specific angle from the circular line demarcating the outer diameter of the body 11 of the drum 10. There is coupled to the sliding guide 120 an outlet guide 70 which also has an opening for the passage of the cable 20 which is coupled to the opening 121 of the sliding guide, and provides an outlet for the cable 20 to come out of the unit 100. This outlet guide 70 sits on the cover casing 150 and abuts with a prolongation 151 of the cover casing 150, as shown in FIG. 5.

The opening 121 of the sliding guide 120 has a height covering, according to one implementation, at least the gap existing between the ends 16 and 18 of the helical groove 13. In the illustrated embodiment, the opening 121 has a rectangular shape with a circular end located adjacent to, near or coinciding substantially with the position of the end 18 where the helical groove 13 ends, the other end of the opening 121 being open and located adjacent to, near, or coinciding substantially with the end 16 where the helical groove 16 starts. The opening 121 is surrounded by a wall 122 of the sliding guide 120 demarcating it.

When the unit for picking up spare wheels 100 has already picked up the spare wheel, the cable 20 is wound completely onto the body 11 of the drum 10, the turns of the cable 20 being tightened against the helical groove 13 due to the tightening torque transmitted by the user by means of the tool. When the user releases the wheel by transmitting a torque with the tool, the drum 10 rotates, pushing the terminal 30, and the terminal 30 in turn pushes the cable 20. The cable 20 is gradually unwound from the drum 10, the cable 20 tending to loosen and separate from the helical groove 13. Since the different turns of the cable 20 are tightly fitted between the helical groove 13 and the wall 161 of the housing casing 160, the cable may brush against the wall 161 as it slides, producing a counter torque contrary to the torque produced when the cable 20 is unwound. This counter torque causes the terminal 30 to tend to rotate, since it is a pivoting terminal, and it causes the stop 35 of the terminal 30 to try to come out of the cavity 19 of the housing 14. Since one turn of the cable 20 passes over the stop 35, the stop 35 cannot be moved and the terminal 30 is blocked. When the cable 20 is unwound and reaches the last turn, the stop 35 is free and the terminal 30 is unblocked. When the terminal 30 reaches with the rotation of the drum 10 the height of the opening 121, it can pivot freely because the opening 121 creates a space with respect to the body 11 of the drum 10, since it is shifted a specific angle from the circular line demarcating the outer diameter of the body 11 of the drum 10. Therefore, the cable 20 cannot form any loop that may damage it, since the terminal 30 is blocked and does not pivot up until the last turn.

As the terminal 30 is open with respect to the circular line demarcating the outer diameter of the body 11 of the drum 10, the end 34 of the projection 33 of the terminal 30 faces the opening 121 of the sliding guide 120, and contacts the wall 122 demarcating the opening 121. Therefore, the rotation of the drum 10 is stopped. This prevents another problem which would consist of the drum 10 continuing to rotate as a result of the inertia of the rotation. In the absence of the wall 122 the cable 20 could be wound in the opposite direction and cause significant damage to the cable 20.

What is claimed is:

1. A unit for picking up a spare wheel comprising:
an elongate cable having a first end and an opposite second end,
a drum that rotates about a first axis of rotation, the drum including a body having a first end, a second end and a side surface disposed between the first and second ends, the side surface including a helical groove onto which the elongate cable is capable of being wound and unwound,
a terminal comprising an elongate projection onto which is attached the first end of the cable, the elongate projection having a first end, a second end, a first side and a second side, the first end of the elongate projection being pivotally coupled to the drum, the first side facing toward the first end of the body of the drum, the second side facing toward the second end of the body of the drum, the first end of the cable being attached to the second end of the elongate projection,
a stop protruding from the second side of the elongate projection at or near the second end of the elongate projection, the stop protruding from the second side of the elongate projection in a direction toward the second end of the body of the drum, the stop having an external surface that faces away from the side surface of the body of the drum, the stop having an end that is located nearer the second end of the body of the drum than the second side of the elongate projection, the external surface of the stop residing between the second side of the elongate projection and the end of the stop: and
the cable being wound on the drum within the helical groove with at least a portion of the cable acting on the external surface of the stop to prevent the terminal from pivoting, and when the cable is wound on the drum no portion of the cable rests on an external surface of the elongate projection.

2. A unit according to claim 1, wherein the helical groove has a first end situated near the first end of the body and a second end situated near the second end of the body, when in a first pivotal position an end of the terminal from which the cable extends is situated adjacent or near the first end of the helical groove, the portion of the cable that acts on the stop to prevent the terminal from pivoting comprising at least one turn of the cable.

3. A unit according to claim 2, wherein the portion of the cable that acts on the stop to prevent the terminal from pivoting comprises a part of a first turn of the cable, the first turn originating at the first end of the helical groove.

4. A unit according to claim 1, wherein the terminal pivots about a second axis of rotation, the second axis of rotation being substantially parallel to the first axis of rotation.

5. A unit according to claim 2, wherein at least a portion of the terminal is located in a housing of the body, the body comprising an opening located at or adjacent the first end of the helical groove, the cable extending from the terminal into the first end of the helical groove through the opening.

6. A unit according to claim 2, wherein the terminal is located in a housing of the body of the drum, the stop being located in a first cavity of the housing, the first cavity comprising a face that opens out towards the side surface of the body allowing the passage of the stop outwards, the at least one turn of the cable passing over the stop.

7. A unit according to claim 2, wherein the terminal comprises a first part having a longitudinal axis that is substantially parallel to the first axis of rotation, the terminal pivotal about the longitudinal axis with an end of the first part of the terminal housed in a second cavity of the body.

8. A unit according to claim 7, wherein the first part of the terminal is substantially cylindrical and the second cavity comprises a substantially cylindrical cavity.

9. A unit according to claim 5, wherein the second end of the elongate projection is located adjacent the opening when the terminal is in the first pivotal position.

10. A unit according to claim 1, further comprising a housing casing in which the drum is housed, the housing casing having a wall which at least partially surrounds the helical groove and provides a space with the helical groove to allow the passage of the cable as the cable is wound or unwound.

11. A unit according to claim 10, further comprising a guide assembled in the housing casing, the guide having an opening allowing the passage of the cable, the opening facing the helical groove and offset by an angle from the circular line demarcating an outer diameter of the body of the drum.

12. A unit according to claim 11, wherein the opening of the guide is at least partially surrounded by a wall, the wall configured to stop the rotation of the drum when the cable is completely unwound from the drum.

13. A unit according to claim 12, wherein the helical groove has a first end situated near the first end of the body and a second end situated near the second end of the body, when in a first pivotal position the second end of the elongate projection from which the cable extends is situated adjacent or near the first end of the helical groove, the portion of the cable that acts on the stop to prevent the terminal from pivoting comprising at least one turn of the cable, the terminal comprising a first part having a longitudinal axis that is substantially parallel to the first axis of rotation, the terminal pivotal about the longitudinal axis with an end of the first part of the terminal housed in a second cavity of the body, the elongate projection oriented substantially perpendicular to the first part, the elongate projection having a first end coupled to the first part, the rotation of the drum is stopped by the second end of the elongate projection of the terminal contacting the wall of the guide.

14. A unit according to claim 13, wherein when the cable is unwound sufficiently to allow the terminal to pivot, the second end of the elongate projection of the terminal faces the opening of the guide.

* * * * *